United States Patent Office 3,471,204
Patented Oct. 7, 1969

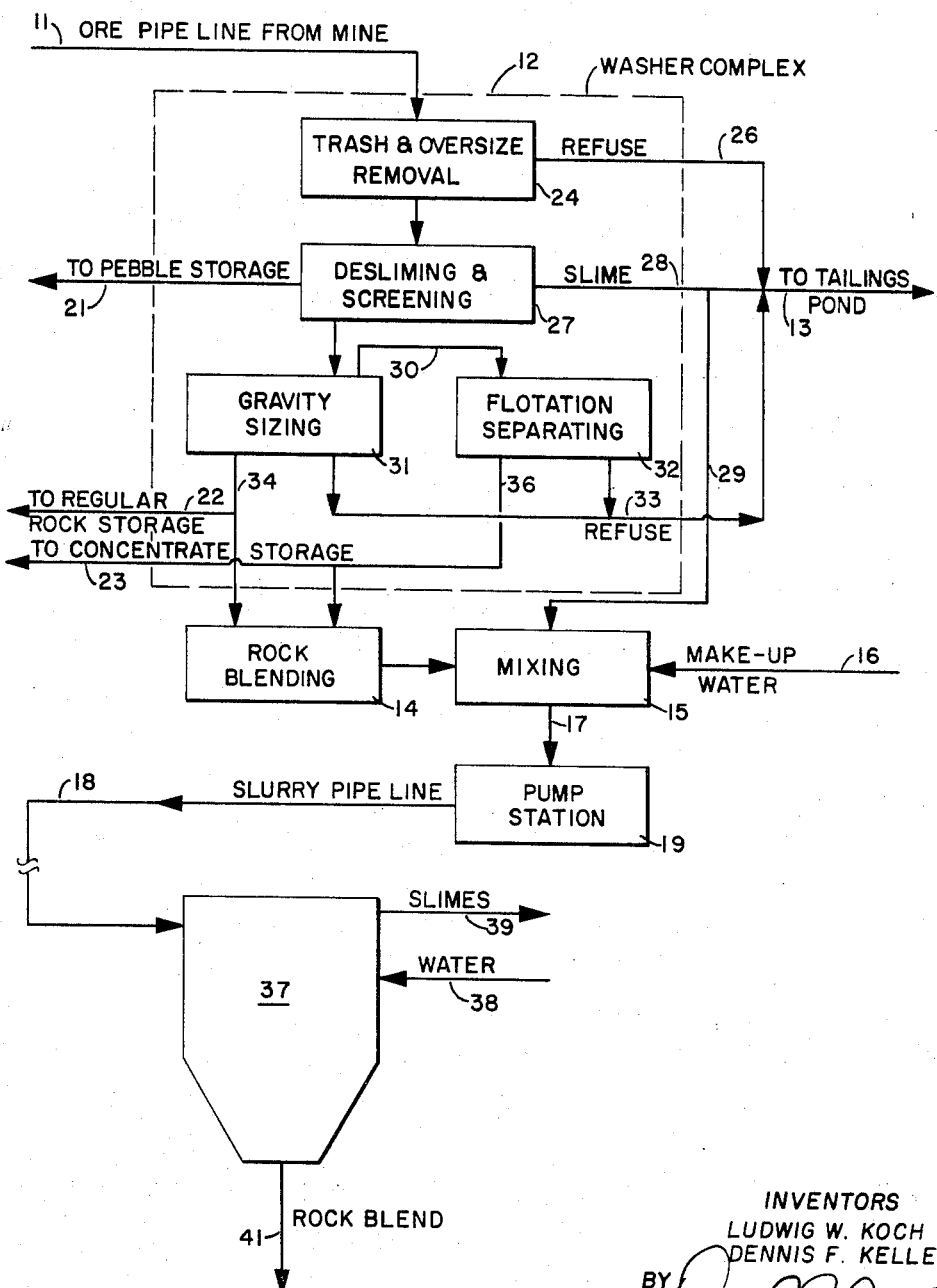

3,471,204
PREPARATION AND TRANSPORTATION OF SLURRIES
Ludwig W. Koch and Dennis F. Keller, Ponca City, Okla., assignors to Continental Oil Company, Ponca City, Okla., a corporation of Delaware
Filed May 19, 1967, Ser. No. 639,780
Int. Cl. B65g 53/30
U.S. Cl. 302—14       5 Claims

ABSTRACT OF THE DISCLOSURE

To prepare phosphate ore for pipeline transport, the ore is dislimed and sized into two fractions. The two fractions are blended and slimes and water are mixed with said blend to create a liquid-phosphate stable slurry. Said slurry is transported through the pipe line, removed therefrom at its destination and the added slime is then separated from the slurry.

BACKGROUND

In recent years, it has become increasingly necessary to provide systems capable of transporting large quantities of relatively inexpensive solid materials at a minimum cost. To this end, extensive conveying operations have been installed at some locations where the distances over which such inexpensive solid materials were to be transported were relatively short. Additionally, both rail and barge transportation have been used for the materials; although, in many instances, the expenses involved have all but precluded the economic advantages to be gained from the transport.

Comparatively recently it has been suggested that comminuted solids may be transported from one point to another by creating a liquid-solid slurry which is then pumped through a pipeline. While the pipelining of solids in slurries is attractive economically as an abstract proposition, there have been substantial technical problems involved in preventing settling and packing of the slurry within the pipeline. When such settling and compaction occurs, the economic advantages inherent in pipeline transportation rapidly disappear due to the difficulty in removing the compacted solids.

A number of methods have been suggested for alleviating the problems of compaction and settling. For instance, it has been suggested that closely controlling the size of the slurry particles may alleviate the tendency of such particles to settle. Similar schemes have involved the idea of altering the average density of the particles by including quantities of lighter material, while other such methods have depended upon roughening the interior of the pipe to create eddy currents and accentuate turbulence within the pipeline. Unfortunately, however, none of these prior art methods have produced the hoped for results under a broad spectrum of conditions; and, in some instances, the resultant adulteration or communition of the slurried solids defeats the economics of pipeline slurry transportation. Thus, until the present invention, a method for preparing and transporting slurries by pipeline without appreciable degradation or settling during transport or compaction during shutdown has remained an elusive desideratum.

SUMMARY OF INVENTION

The present invention contemplates the method of preparing a stable slurry which includes the steps of separating slimes from phosphate rock followed by the addition of an effective amount of said slimes to a mixture of size graded phosphate rock particles.

DESCRIPTION OF THE DRAWING

The accompanying drawing discloses a schematic flow diagram for one method of practicing the present invention.

In this diagram, no attempt has been made to specifically identify the mechanical elements for accomplishing the various steps indicated. Moreover, aside from an occasional suggestion of suitable apparatus, no particular attention is given in the following detailed description to the mechanical details for accomplishing the process. This lack of mechanical detail in the disclosure arises from the fact that various procedures have long been used in the mining art for upgrading and separating rock ore, and such procedures will be well known to those skilled in the art.

DEFINITIONS

The ore from which commercial phosphate rock is obtained occurs in many places in relatively unconsolidated deposits with relatively pure phosphate occuring as inclusions in a matrix made up of other material of various kinds. The phosphate rock usable in the present invention ranges in size from particles which are only slightly too large to pass a 150 Tyler mesh screen to larger particles which will pass through a 2 Tyler mesh screen. As used hereinafter, the term "pebbles" connotes rock having a diameter of from about .75 to about .10 inch, the term "regular rock" connotes rock which will pass a No. 6 Tyler and be retained on a No. 14 Tyler screen, and the term "concentrate" connotes rock which will pass a No. 14 Tyler and be retained upon a No. 150 Tyler screen.

The matrix which accompanies the usable phosphate rock varies in composition from site to site but ordinarily includes a variety of materials, such as: clay minerals; organic materials, such as tree roots and the like; limited amounts of silicates; undersized and oversized phosphate rock and other mineral constituents. For convenience in reference in later portions of this specification, that part of the matrix which is larger in size than pebble rock, or which consists of organic material, will hereinafter be referred to as "trash." Similarly, the term "slime solids," as used hereinafter, connotes the materials from the matrix having a particle diameter less than about 5 microns. Obviously, the chemical makeup of these slime solids will vary from deposit to deposit; although, in general, slime solids will include major amounts of clay minerals, especially montmorillonite, plus minor amounts of other constituents, such as: phosphate rock and silica particles. When slime solids are mixed with sufficient water to flow, the resulting mixture is referred to hereinafter as "slime."

DETAILED DESCRIPTION

Phosphate rock ore is ordinarily mined by impinging high velocity jets of water on the ore body to break down the matrix and form an aqueous mixture including upgraded phosphate rock, slime solids, and trash. In the drawing, an ore pipeline 11 leads from such a mining area (not shown) to a washer complex indicated generally by the number 12. Within washer complex 12, the ore is sized, with the matrix material and any excess slimes in the ore body being removed to a tailings pond as indicated at 13. Pebbles are removed to storage by any convenient means, such as: conveyer, gondola or chute, as indicated generally at 21; while excess regular rock and/or concentrate are removed from washer complex 12 by similar means as indicated at 22 and 23, respectively. Additional amounts of concentrate and regular rock are removed from washer complex 12 to blender 14 from which the rock blend is mixed in chamber 15 with an effective amount of tailing slimes from the washer complex to form a stable slurry. If necessary, make-up water for the slurry is introduced to mixing chamber 15 through conduit 16.

Washer complex 12 may include a plurality of stages at which the rock ore is washed, separated, sized and graded. Thus, immediately upon being discharged from pipeline 11, the rock ore may be introduced to means for removing trash, which commonly comprises a vibrating screen and which is indicated generally in the drawing by numeral 24. The trash is removed from the washer complex by means 26, which may comprise conveyors, gondolas or other similar types of structure, and ultimately discharge to the tailings pond.

After passing trash removing means 24, the upgraded ore is next introduced to separating means 27 for removing slime and size grading the rock. Commonly, means 27 comprises a No. 2 Tyler vibrating screen from which pebbles are removed to storage as indicated at 21. In addition to the screen, means 27 may also include apparatus for flowing water on the material during screening to remove slimes. Thus, below the screen a catch basin may be provided from which slimes are removed from the washer complex through a conduit 28. A portion of the slines is subsequently reintroduced into mixing chamber 15 in a controlled amount through passageway 29, while excess slimes are passed to the tailings pond.

Regular rock and concentrate coming from separating means 27 is further isolated by gravity sizing means 31 and flotation separating means 32, respectively. As was mentioned previously, gravity sizing means 31 and flotation separating means 32 may be any one of a number of types of apparatus well known in the art, for instance: gravity sizing means 31 may comprise a vessel into the top of which the regular and concentrate is added and within which there may be an upwardly moving current of water which has a space velocity such that regular rock falls to the bottom of means 31 while slimes and concentrate are removed from the top thereof. Subsequently the regular rock may be removed by siphon or other suitable means through passageway 34 and ultimately to blender 14 or to regular rock storage as indicated at 22.

The slimes and concentrate are passed from gravity sizing means 31 through conduit 30 to flotation separating means 32. Within flotation separating means 32 the remaining slimes are removed through a channel 33 which leads to the tailings pond while the concentrate is removed through a passageway 36 either to storage, as indicated at 23, or directly to blender 14 from which it is passed to mixing chamber 15, as set forth above.

As the slurry is formed in mixing chamber 15, it is removed via a conduit 17 and injected through a pump station 19 into a slurry pipeline 18.

After passing through pipeline 18, the slurry is introduced into a decanting vessel 37 where water from conduit 38 is mixed with the slurry to decrease the total solids content of the mixture to a point below about 35 percent by weight. As a result of the excess water in the system, the slimes float to the top of vessel 37 and are removed through passageway 39, while the rock blend is removed from the bottom of vessel 37 as indicated at 41. If desired, the slimes recovered from decanting vessel 37 may be concentrated and returned to mixer 15 or, in the alternative, may be disposed of. In any event, it will probably be found advantageous to concentrate the slimes to recover water for reintroduction into the decanting vessel.

An important feature of the present invention resides in the ratios between regular rock and concentrate which are used in forming the slurry, and also in the amount of slime solids which are used. The total amount of solids is also an important consideration.

In general, a fairly wide range of ratios between regular rock and concentrate may be used; thus, it has been found that from about 0 to about 70 percent of the regular rock may be used in forming the regular rock-concentrate blend in blender 14 with a preferred range being from about 35 to about 70 by weight regular rock.

The purpose in adding the tailing slimes to the rock blend is to form a slurry which will not settle under dynamic pipeline conditions and which will not compact unduly under static conditions in the pipeline. Both of these ends can be achieved by the addition of relatively large amounts of slimes to the slurry. If, for instance, slimes having a solids content equal to half the solids weight of the rock blend were added to the rock blend, the resulting slurry would certainly be stable in the absence of excess water and, assuming it could be moved through a pipeline, there would be little danger of the solids in the slurry settling out while it was being moved through the pipeline. However, when such excessive amounts of slimes are used, the energy requirements for moving the slurry through the pipeline become so great as to preclude the economic utilization of the process. Thus, the optimum percent slime solids which are added to the rock blend is the minimum percent of slime solids which will result in a relatively stable slurry. Quantities of slimes greater than such minimum value may be used and, if used, will result in a stable slurry; however, the economy afforded by this manner of transporting solids will be reduced in proportion to the amount of excess slimes which are introduced into the slurries.

Unfortunately, there is no fixed amount of slime solids which represents the optimum amount for all slurry conditions. Rather, the amount of such slimes varies within relatively narrow limits and depends on the ratio between the regular rock and concentrate introduced in the mixer, as well as the amount of total solids in the finished slurry. Generally speaking, the amount of slimes introduced to mixer 15 is controlled to furnish from about 2 to about 6 percent by weight slime solids in the finished slurry, with the smaller amount of slime solids being used with lower concentrations of regular rock and the 6 percent slime solids being optimum for the higher concentration of regular rock. Specifically, about 3 percent slime solids is optimum when the ratio between regular rock and concentrate is 30–70, respectively, and this value rises to about 6 percent when this ratio changes to 70–30.

Some variation in the optimum amount of slime solids also occurs with variation in the total solids concentration in the slurry which will ordinarily be from about 45 to about 55 percent by weight. In general, in the higher concentrations of slurry solids (55%) fewer slime solids are required than at lower slurry solids concentration (45%) at a given rock blend.

The mutual interdependence of the three variables—rock ratios, optimum slime solids, and total solids—is demonstrated by the following chart:

| Rock ratio, percent by weight | | Minimum slime solids necessary for a stable slurry, percent by weight of total slurry weight for a total solids concentration of— | |
|---|---|---|---|
| Regular | Concentrate | 55 | 45 |
| 70 | 30 | 5 | 6 |
| 50 | 50 | 4 | 5 |
| 30 | 70 | 3 | 4 |
| 0 | 100 | 2 | 3 |

It will be understood that various changes in the details, materials, steps, and arrangement of parts, which have been herein described and illustrated in order to explain the nature of the invention, may be made by those skilled in the art within the principle and scope of the invention.

What is claimed is:

1. A method for preparing a phosphate rock slurry which comprises the steps of:
   (a) providing a quantity of phosphate rock ore of a size range −2 +150 mesh in admixture with water;
   (b) removing phosphatic slime of a size range −5 microns from said ore;
   (c) separating from said ore a portion consisting essentially of regular rock of a size range −6 +14 mesh and a portion consisting essentially of concentrate of a size range −14 +150 mesh;

(d) blending at least a portion of said regular rock and said concentrate to form a rock blend including at most about 70 percent regular rock; and (e) mixing with said rock blend water and a portion of said phosphatic slime such that the resulting stable slurry contains from about 2 to about 6 percent of said slime and from about 45 to about 55 percent total solids.

2. The method of claim 1 wherein said rock blend contains between about 30 and about 70 percent regular rock.

3. The method of transporting phosphate rock as a slurry which comprises the steps of:

(a) providing a quantity of phosphate rock ore of a size range −2 +150 mesh in admixture with water;

(b) removing phosphatic slime of a size range −5 microns from said ore;

(c) separating from said ore a portion consisting essentially of regular rock of a size range −6 +14 mesh and a portion consisting essentially of concentrate of a size range −14 +150 mesh;

(d) blending at least a portion of said regular rock and said concentrate to form a rock blend including at most about 70 percent regular rock;

(e) mixing with said rock blend water and a portion of said phosphatic slime such that the resulting stable slurry contains from about 2 to about 6 percent of said slime and from about 45 to about 55 percent total solids;

(f) introducing said slurry into a pipeline;

(g) moving said slurry through said pipeline;

(h) removing said slurry from said pipeline and placing it in a holding vessel;

(i) introducing additional water to said holding vessel to float said slimes upwardly therein; and (j) removing said slimes from an upper portion of said vessel and removing said rock blend from a lower portion of said vessel.

4. The method of claim 3 wherein said rock blend contains between about 30 and about 70 percent regular rock.

5. The method of transporting and recovering phosphate rock which comprises the steps of:

(a) removing from the earth a quantity of phosphate rock ore in admixture with water;

(b) removing trash of a size +0.75 inch from said ore;

(c) washing said ore to remove therefrom slime of a size range −5 microns;

(d) separating from said rock ore a portion consisting essentially of pebbles of a size range −0.75 +0.10 inches;

(e) isolating regular rock of a size range −6 +14 mesh from said rock ore by gravity separation;

(f) isolating concentrate of a size −14 +150 mesh from said rock ore by flotation;

(g) blending said regular rock and concentrate to form a rock blend consisting essentially of from about 30 percent to about 70 percent regular rock;

(h) mixing said rock blend with said slime to produce a slurry comprising water, from about 3 to about 6 percent slime solids, and from about 45 to about 55 percent total solids;

(i) introducing said slurry into a pipeline;

(j) moving said slurry through said pipeline;

(k) removing said slurry from said pipeline and placing it in a holding vessel;

(l) injecting sufficient additional water into the slurry to float the slimes upwardly away from the rock blend; and (m) removing said slimes from the top of said vessel and said rock blend from the bottom of said vessel.

References Cited

UNITED STATES PATENTS

| | | | |
|---|---|---|---|
| 1,810,571 | 6/1931 | Mead | 299—17 |
| 2,708,517 | 5/1955 | Evans | 209—158 |
| 2,920,923 | 1/1960 | Wasp | 302—66 |
| 3,083,829 | 4/1963 | Dietert | 209—161 |
| 3,168,350 | 2/1965 | Phinney | 302—14 |
| 3,314,730 | 4/1967 | Anderson | 302—14 |

FRANK W. LUTTER, Primary Examiner

U.S. Cl. X.R.

209—10, 12, 158; 302—66